March 16, 1943.  A. S. JACKSON ET AL  2,314,310
BOTTLE TESTING APPARATUS
Filed Aug. 16, 1940  7 Sheets-Sheet 1

INVENTORS
A. S. JACKSON
C. A. HEYNE.
BY
ATTORNEYS

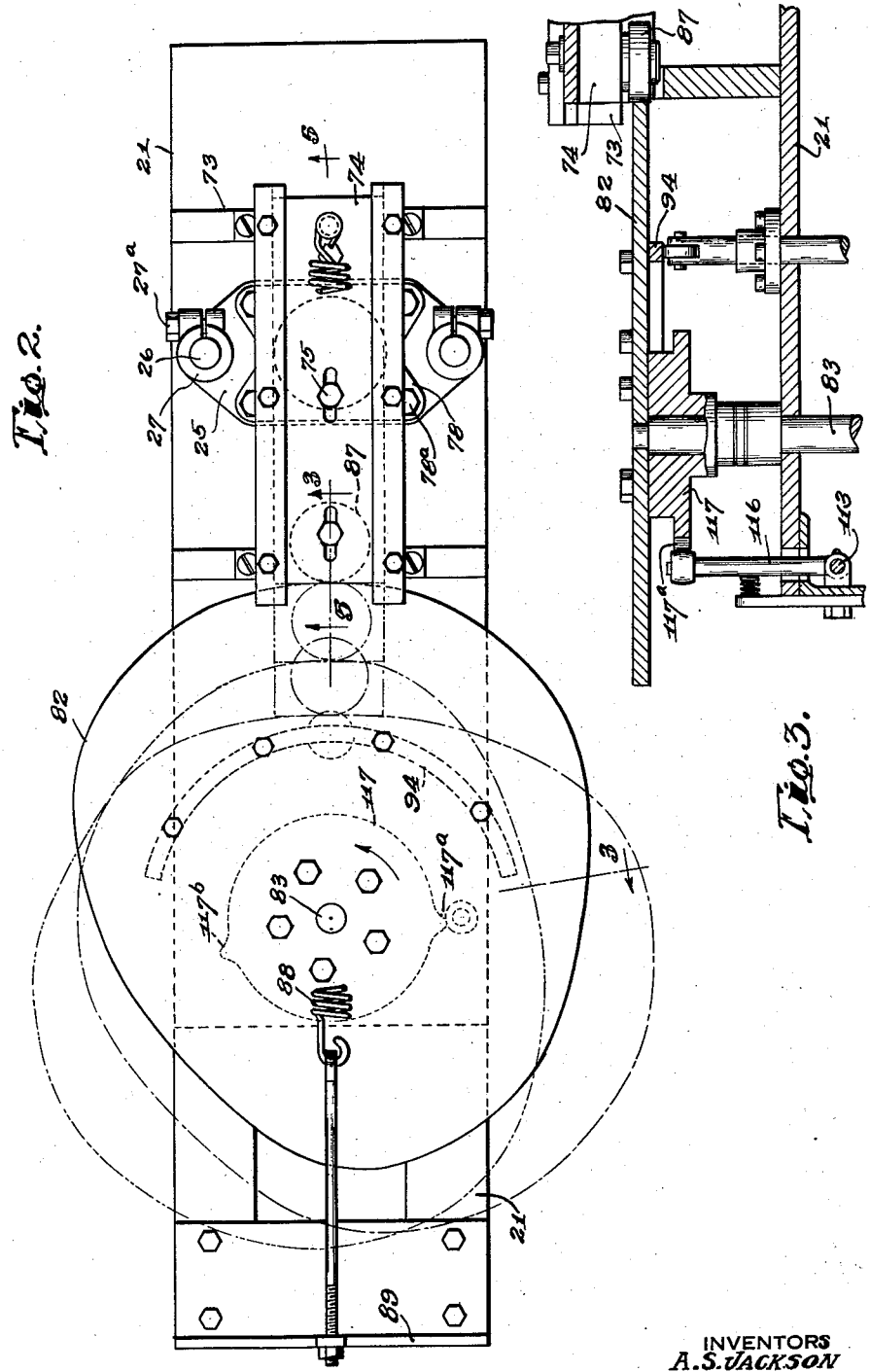

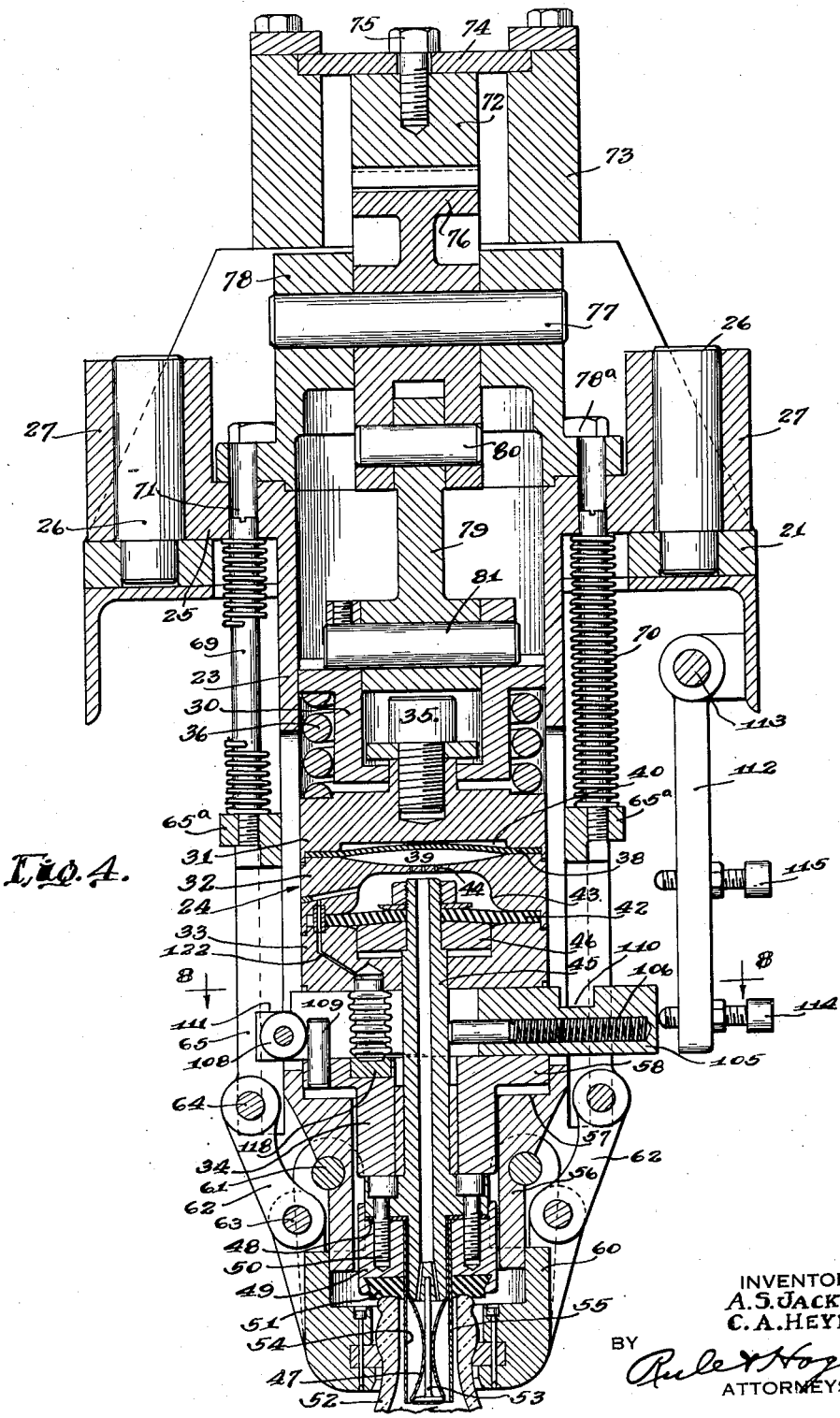

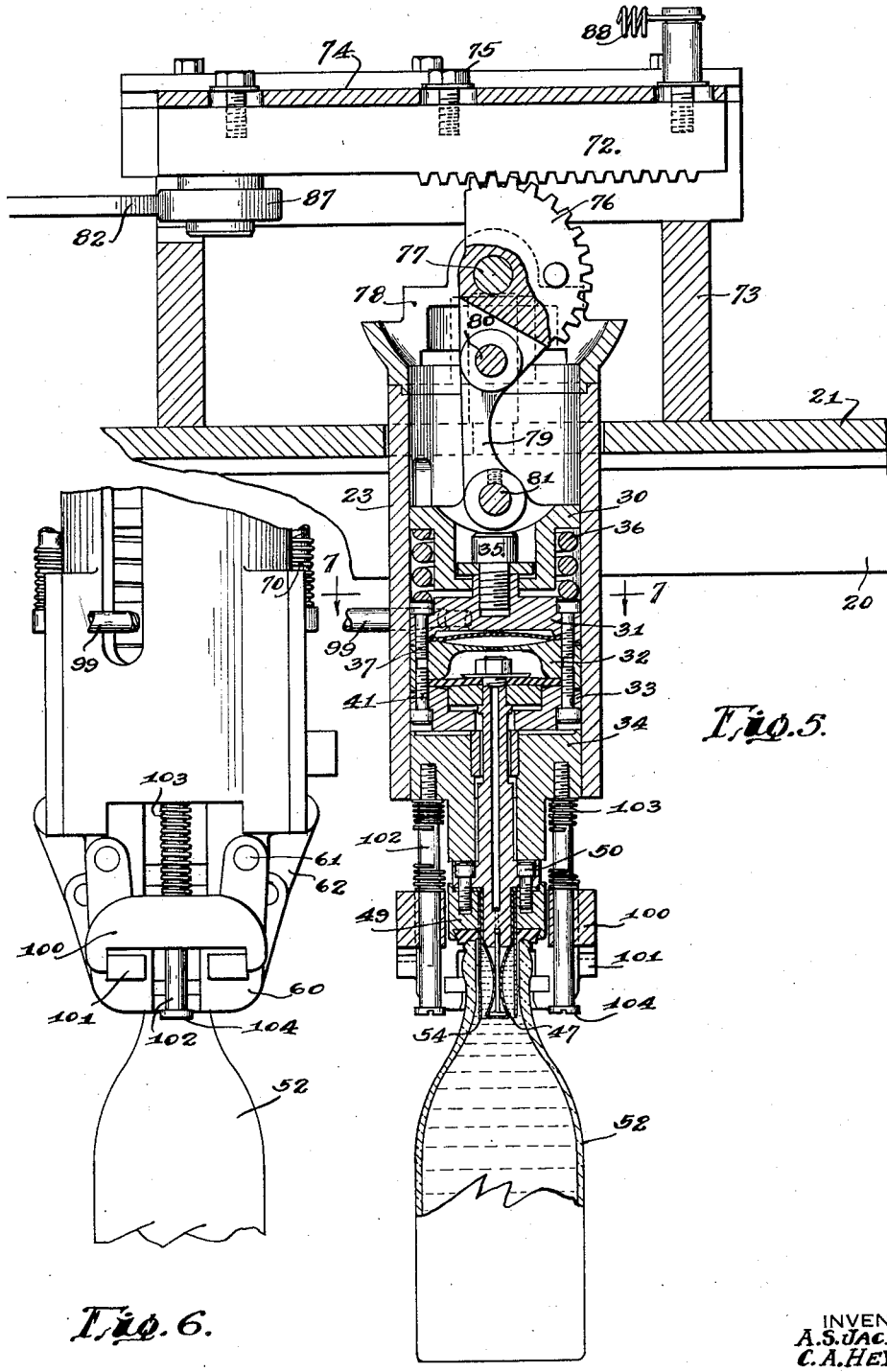

March 16, 1943.  A. S. JACKSON ET AL  2,314,310

BOTTLE TESTING APPARATUS

Filed Aug. 16, 1940   7 Sheets-Sheet 5

INVENTORS
A. S. JACKSON
C. A. HEYNE.
BY Rule & Hoge
ATTORNEYS

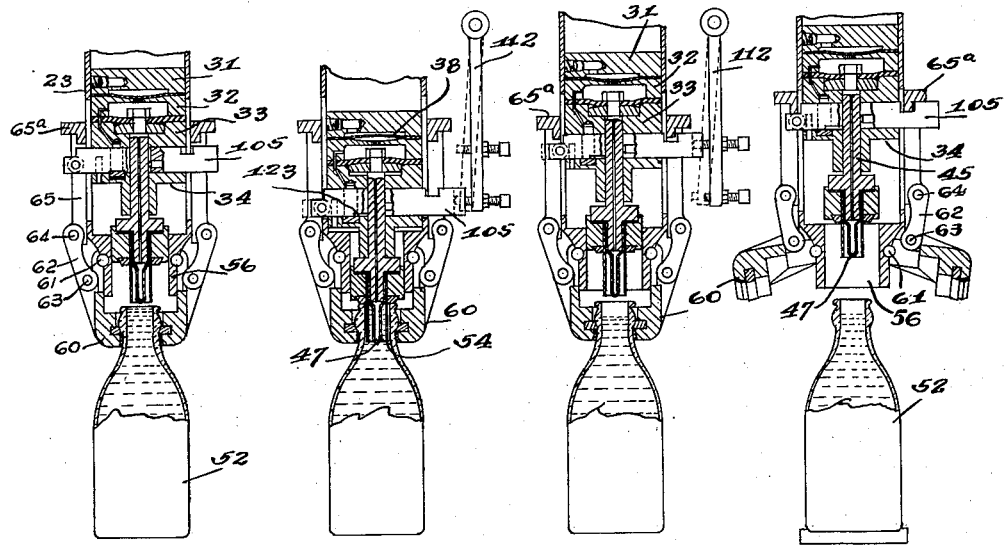
Fig. 12. Fig. 13. Fig. 14. Fig. 15.
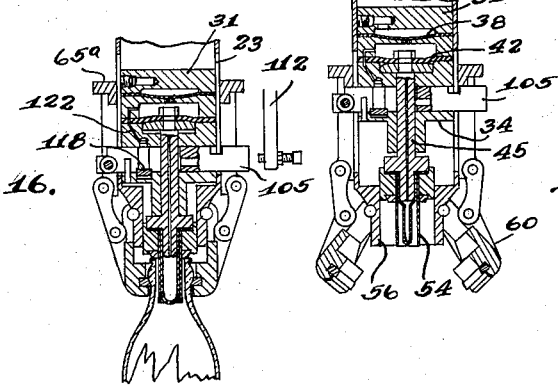
Fig. 16. Fig. 17.
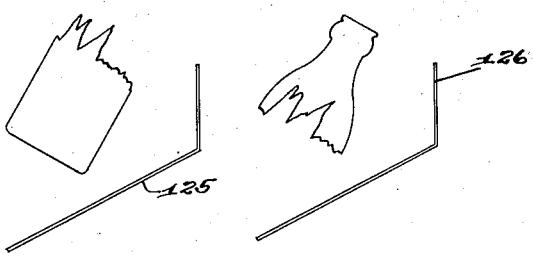
INVENTORS
A. S. JACKSON
C. A. HEYNE.
BY Rule & Hoge
ATTORNEYS Patented Mar. 16, 1943

2,314,310

UNITED STATES PATENT OFFICE 2,314,310

BOTTLE TESTING APPARATUS

Albert S. Jackson, Wood River, and Clarence A. Heyne, Alton, Ill., assignors to Owens-Illinois Glass Company, a corporation of Ohio Application August 16, 1940, Serial No. 352,916

17 Claims. (Cl. 73—51)

Our invention relates to apparatus for testing the strength of bottles, jars and other hollow articles by the application of hydraulic pressure to the interior of the articles. The invention further includes means for automatically segregating and discarding defective ware.

An object of the invention is to provide reliable and practical testing apparatus by which a predetermined degree of hydraulic pressure may be applied within the articles for a definite predetermined length of time.

The invention as herein illustrated is adapted for testing bottles. As a practical example, such apparatus is used for testing bottles having comparatively thin walls, an internal pressure of 140 lbs. per square inch more or less being applied for a period of eight or ten seconds. When used in this manner the apparatus serves automatically to eliminate practically all bottles which are defective owing to seeds, surface scratches, thin spots, poor distribution of the glass or any other defects which weaken the bottle so that it will not withstand the applied pressure. The above example is not to be taken as a limitation or indication of the scope of the invention which is adaptable for use in testing a wide variety of ware and under widely varying conditions.

Other objects of the invention will appear hereinafter.

Referring to the accompanying drawings:

Fig. 2 is a plan view of the same;

Fig. 3 is a sectional elevation taken at the line 3—3 on Fig. 2 illustrating the cam mechanism;

Fig. 4 is a vertical section at the line 4—4 on Fig. 1, on a comparatively large scale, showing a pressure head or unit;

Fig. 5 is a section at the line 5—5 on Fig. 2;

Fig. 6 is a fragmentary elevation of a portion of the mechanism shown in Fig. 5, looking in a direction at right angles thereto;

Figure 18:
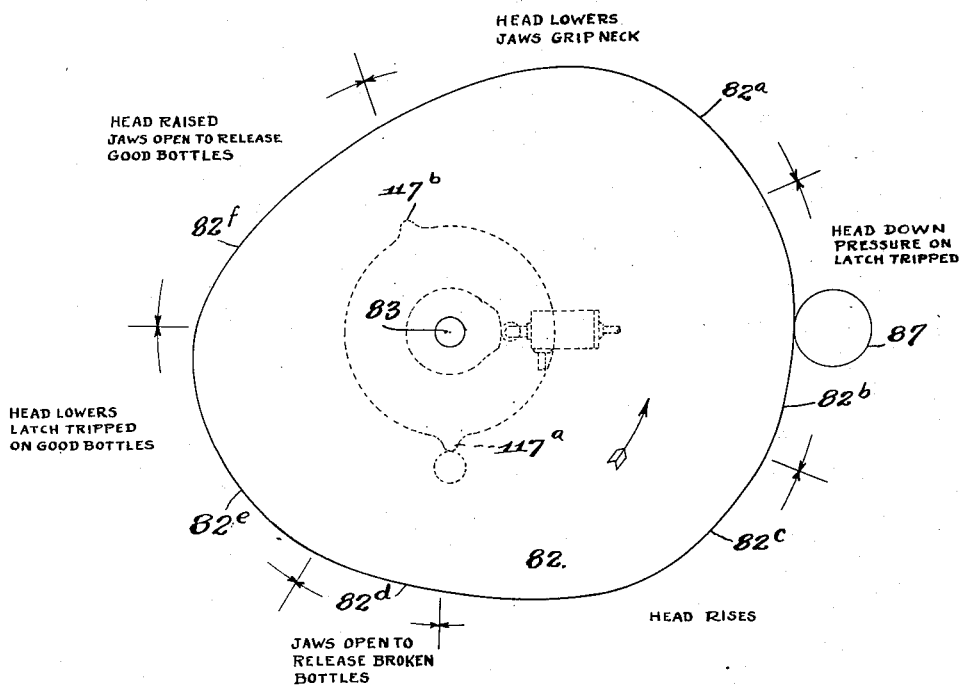

Figs. 12 to 15 inclusive are sectional views, partly diagrammatic, illustrating successive steps in the operation of the apparatus and show the operation as applied to a perfect bottle;

Figs. 16 and 17 illustrate the operation when the bottle is defective and unable to withstand the pressure;

Fig. 18 is a diagrammatic view of the operating cams; and

Figure 19:
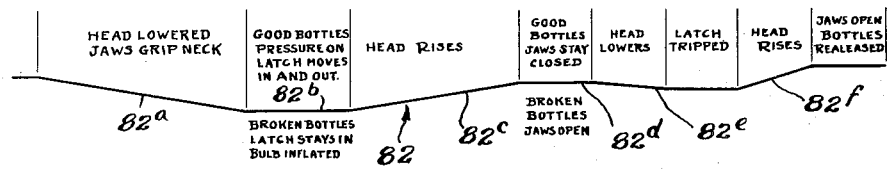

Fig. 19 is a chart showing a development of the main cam and the sequence of operations controlled thereby.

Figure 1:
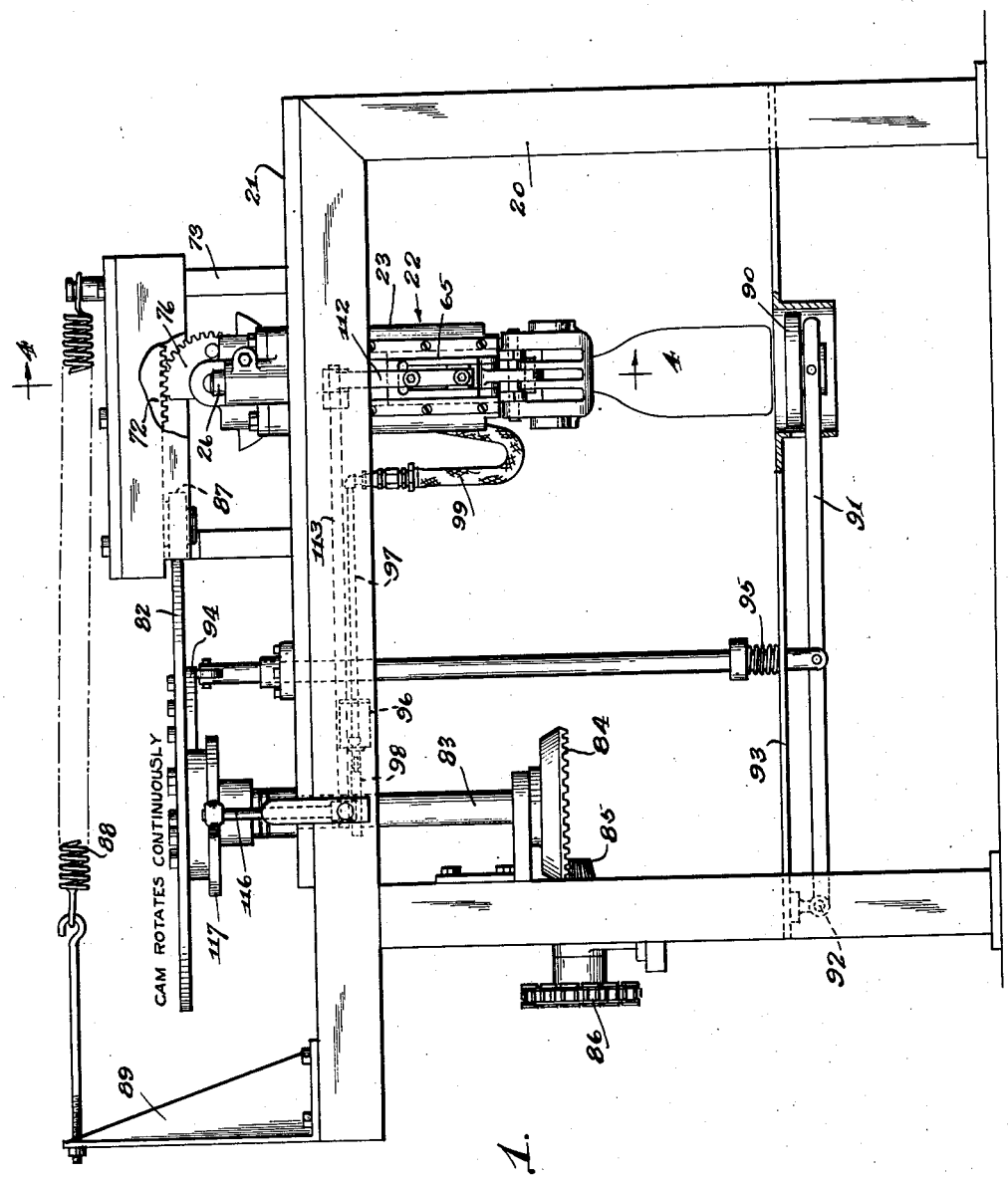
Fig. 1 is a front elevation of a testing apparatus embodying the principles of our invention.

Referring particularly to Figs. 1 and 2, the testing apparatus is mounted on a framework 20 which supports a platform 21. A testing head or unit 22 comprises a cylinder 23 supported by the platform 21 and a composite plunger or piston 24 (Figs. 4 and 5) which has reciprocating movement within the cylinder. The cylinder 23 is formed at the upper end thereof with a flange portion or head 25 which seats on the platform 21. The cylinder is held in position by posts 26 rising from the platform and fitting in split bearing sleeves 27 formed on the head 25 and secured to the posts by clamping bolts 27ª (Fig. 2).

The plunger 24 includes sections 30, 31, 32, 33 and 34 arranged one above another and connected to move up and down as a unit. Means for connecting the sections 30 and 31 includes a bolt 35, the construction being such that it permits a limited relative up and down movement of said sections. A heavy coil spring 36 held under compression between said sections serves as a cushioning means to prevent a crushing pressure being applied to the lip of the bottle when the plunger is lowered. The sections 31 and 32 are clamped together by screw bolts 37 (Fig. 5). A diaphragm 38 of flexible impervious material, such as rubber, is clamped between the sections 31 and 32. The upper surface of the section 32 is concave as shown to provide a space or chamber 39 between the diaphragm and said section. Said chamber 39 forms part of a sealed hydraulic system within the plunger mechanism as hereinafter described. The lower face of the section 31 is recessed to provide an air space 40 above the diaphragm.

The sections 32 and 33 are connected by bolts 41 with a flexible diaphragm 42 of rubber or the like clamped therebetween. The lower side of the section 32 is recessed to form a chamber 43 which is in communication with the chamber 39 through a series of openings 44. A plunger rod 45 is clamped to the diaphragm 42 which provides a yielding connection between the plunger and said rod. A disk 46 mounted on the plunger rod seats on a shoulder formed on said rod and provides a backing for the diaphragm 42.

Attached to the plunger rod at the lower end thereof is a membrane 47 in the form of a bulb or sack and which may consist of rubber or other impervious, elastic sheet material. The upper portion of the said sack surrounds the lower end portion of the rod 45, the upper end of the sack being formed with a horizontal rim 48 which is clamped between a flange portion of the plunger rod and a ring 49, by means of bolts 50. Mounted in the lower face of the ring 49 is a rubber sealing gasket 51 adapted to seat on the upper end of the bottle 52 which is to be tested. The gasket 51 and membrane 47 provide a hermetic seal for the bottle. The membrane forms a diaphragm through which hydraulic pressure is transmitted to the liquid in the bottle as hereinafter described.

The plunger rod 45 is formed with a bore extending throughout its length and opening at its upper end into the chamber 43 and at its lower end communicating with the interior of the bulb 47. It will be seen that the construction above described provides an inner sealed space or system comprising the chambers 39 and 43, the channel through the plunger rod, and the bulb 47. Said space is filled with water, oil or other liquid. Attached to the lower end of the plunger rod 45 is a stem 53 extending downward within the bulb 47 and formed at its lower end with a horizontal disk, thereby providing an interior support for the bulb. Surrounding the bulb is a cylindrical shield 54 open at its lower end and provided with openings 55 in the side walls thereof.

The cylinder 23 is formed at its lower end with an integral section 56 of reduced diameter (see Figs. 4 and 12) having an annular horizontal top surface 57 providing a stop to limit downward movement of the plunger. The section 34 of the plunger seats on the flange portion of the plunger rod 45, said section comprising a head portion 58 which is normally spaced a short distance above the surface 57 while the piston is in its lowered position.

Figure 7:
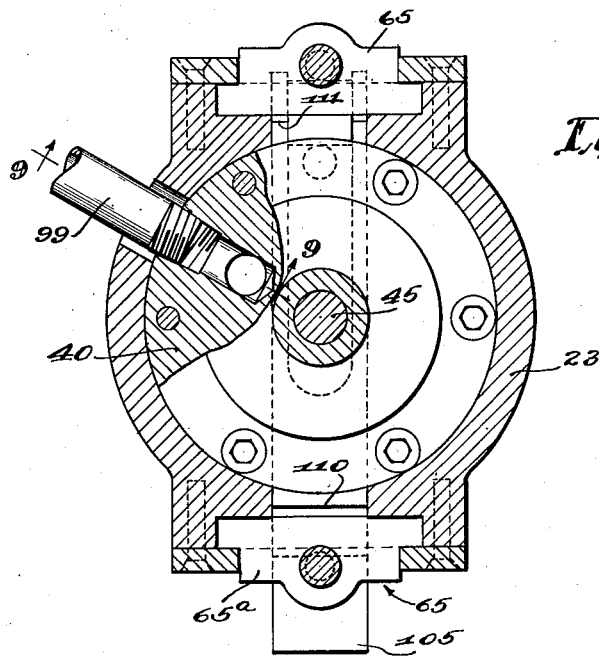
Fig. 7 is a section at the line 7—7 on Fig. 5.

A pair of bottle gripping jaws 60 (see Figs. 4, 12, 15) is pivotally connected by pins 61 to the section 56 of the cylinder. Means for swinging the jaws about their pivots includes links 62, each connected at its lower end to the jaw by a pivot 63 and at its upper end connected by a pivot 64 to a vertical slide member 65. Each of said slide members (Figs. 4 and 8) comprises a pair of parallel bars mounted for up and down movement in guideways 66 formed in an enlarged portion 67 of the cylinder 23. The bars of each of said pairs are connected at their upper ends by a cross-bar 65ª (Figs. 4 and 7). Vertical rods 69 are screw-threaded at their lower ends into the cross-bars 65ª and have mounted thereon coil springs 70 held under compression between said cross-bars and the head 25 of the cylinder. The rods 69 are movable up and down in openings 71 provided in the head 25.

The plunger 24 is movable up and down in the cylinder 23 for lifting and lowering the clamping jaws and also for swinging them about their pivots in the manner hereinafter set forth. The lifting and lowering movements of the plunger are effected through mechanism including a horizontal rack bar 72 (Figs. 1, 4 and 5) which reciprocates in a supporting frame 73 mounted on the platform 21. A plate 74 extending lengthwise of the rack bar is attached thereto by bolts 75 extending through elongated slots in said plate. The rack engages a segmental gear 76 on a pivot pin 77 mounted in a pair of bearing plates 78 attached by bolts 78ª to the upper end of the cylinder 23. A link 79 is connected by a pivot 80 to the gear segment and by a pivot pin 81 to the plunger section 30.

The reciprocating movements of the rack 72 are under the control of a horizontally disposed cam 82 keyed to the upper end of a vertical shaft 83 journalled in the machine frame. The lower end of the shaft carries a beveled gear 84 driven by a pinion 85 having driving connections, which may include a sprocket wheel and chain 86, with an electric motor or source of power (not shown) by which the cam 82 is rotated continuously. A cam follower roll 87 (Figs. 1, 2, 3) on the rack bar provides a driving connection between the cam and rack bar. A coil spring 88 anchored at one end to a bracket 89 on the machine frame and connected at its other end to the slide bar, holds the roll 87 in engagement with the cam.

Means for supporting a bottle beneath the testing head includes a bottom plate 90 (Fig. 1) carried on one end of a horizontal arm 91, the other end of which is pivoted at 92 to a lower platform 93 on the machine frame. The plate 90 is periodically moved up and down for the purpose hereinafter set forth, the downward movement being effected by a cam patch 94 on the under surface of the cam plate 82, and the upward movement by a coil spring 95.

Figure 9:
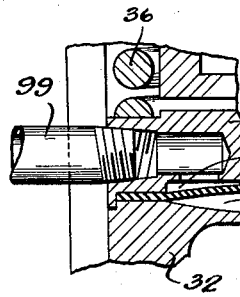
Fig. 9 is a fragmentary section at the line 9—9 on Fig. 7, showing a portion of the air pressure line.

Air or other operating gas or fluid under pressure is periodically transmitted to the pressure head from a source of supply (not shown) under the control of a valve 96 (Fig. 1) in a pressure line 97. The valve is actuated by a cam 98 on the shaft 83. The pressure line includes a flexible hose or pipe 99 which leads to the piston and opens into the chamber 40 in the section 31 (see Figs. 5, 7, 9). The application of pressure is timed to be applied immediately after a bottle 52, filled with water, is gripped by the jaws 60. This pressure within the chamber 40 is transmitted through the diaphragm 38 to the sealed hydraulic system which is filled with liquid and thereby applies pressure through the bulb 47 to the interior of the bottle which is at this time full of liquid and sealed by the gasket 51.

The jaws 60 are locked in bottle gripping position during the testing operation by a pair of locking yokes 100 (Figs. 5 and 6) which embrace lugs 101 on the jaws. Said yokes are mounted for sliding movement up and down on rods 102 attached to the plunger section 34. Coil springs 103 mounted on said rods, and held under compression between the plunger and the yokes, hold said yokes in locking position while the bottle is suspended by said jaws as hereinafter described. When the plunger is drawn upwardly a sufficient distance to open the jaws, the locking yokes 100 are positively lifted by heads 104 on the rods 102 and disengage the jaws in time to permit the latter to open.

In operating connection between the plunger and the jaws for opening the latter is effected by means of a latch bar 105 extending horizontally through the plunger and adapted for a limited lengthwise reciprocating movement therein. As the plunger is drawn upward, the bar 105 engages the cross-bars 65ª so that continued upward movement of the plunger carries the cross-bars upward with the plunger, compressing the springs 70. The vertical slide members 65, being connected to the cross-bars are thus moved upwardly and through the links 62, (see Figs. 4, 12, 15) swing the jaws 60 outwardly and upwardly about their pivots 61 thereby releasing the bottle. When the plunger is again lowered the springs 70 operate through the cross-bars 65ᵃ, slide members 65 and links 62 to swing the jaws 60 to their closed or bottle gripping position. The jaws are arrested in their inward or bottle gripping position by engagement of the jaws with the lower end portion of the section 56 of the cylinder. The Jaws are thus accurately positioned and held in bottle gripping position under the pressure of the springs 70.

The bar 105 not only serves as a means for lifting the cross-bars 65ᵃ for opening the jaws, but also forms part of mechanism for automatically segregating broken bottles and discharging them at a different position from that at which the sound bottles are discharged. Such mechanism will now be described.

Figure 8:
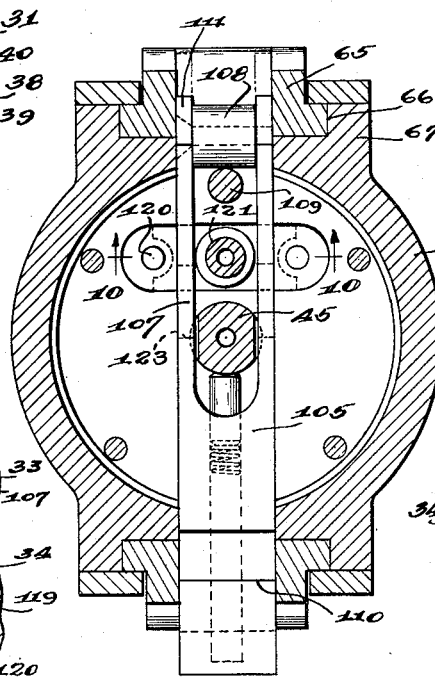
Fig. 8 is a section at the line 8—8 on Fig. 4.

The bar 105 has mounted therein a coil spring 106 held under compression and tending to move the bar to the right. The bar 105 is bifurcated as shown in Fig. 8, providing a pair of arms 107 which straddle the plunger rod 45. A stop block 108 secured between the outer ends of said arms engages a stop pin 109, thereby limiting the movement of the bar 105 to the right. The bar is formed with notches or recesses 110 and 111 on the upper surface thereof at opposite sides of the plunger. As shown in Fig. 4, these notches are in vertical line with the cross-bars 65ᵃ so that when the plunger is lifted, said cross-bars enter the notches (see Figs. 14 and 15). This takes place in the normal operation when a sound bottle is being tested. It will be noted that opening of the jaws does not commence until the latch bar 105 has been lifted to a position in which the cross-bars 65ᵃ have entered said notches.

In case of a defective bottle which breaks during the test, the latch bar 105 is held locked in a position in which the notches 110, 111 are not in line with the bar 65ᵃ. This position is indicated in Figs. 16 and 17. Means for moving the latch bar 105 to the left and locking it in such position includes a vertically disposed rock arm 112 (Figs. 1 and 4) fixed to and depending from one end of a horizontal rock shaft 113, the latter journalled in the machine frame. Contact screws 114 and 115 adjustably mounted in the rock arm are arranged to engage the bar 105 while the latter is in a lowered position and an intermediate position respectively. The shaft 113 has keyed to its opposite end a vertical rock arm 116 (Figs. 1 and 3) carrying a cam roll which runs on a cam disk 117 on the shaft 83. The cam disk is formed with cam lobes 117ᵃ and 117ᵇ which operate to rock the arm 112 to the left (Fig. 4), thereby moving the bar 105 to the left against the tension of its spring, carrying the notches 110 and 111 out of register with the cross-bars 65ᵃ.

The cam is timed to effect this operation after a bottle has been gripped by the jaws and pressure applied therein. The cam lobes permit the rock arm 112 to return immediately after it has moved the bar 105 to the left. If there is pressure within the bottle that is being tested, the bar 105 is also returned to the Fig. 4 position by its spring 106. If the bottle under test is defective so that it breaks, dissipating the pressure therein, the latch bar 105 is locked in its operated position by means presently to be described, so that when the plunger is lifted, the latch bar contacts the cross-bars 65ᵃ without the latter entering the notches 110, 111. As a result the jaws are opened comparatively early during the upward movement of the plunger. This permits discharge of the broken bottle to a cullet chute or other means brought momentarily into receiving position for receiving it from the opening jaws and separating it from the sound bottles.

Figure 10:
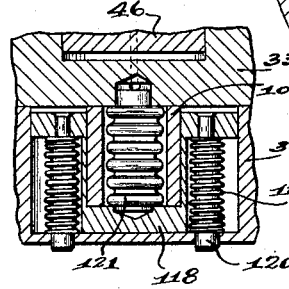
Fig. 10 is a section at the line 10—10 on Fig. 8 showing the bellows and a latch bar controlled thereby.
Figure 11:
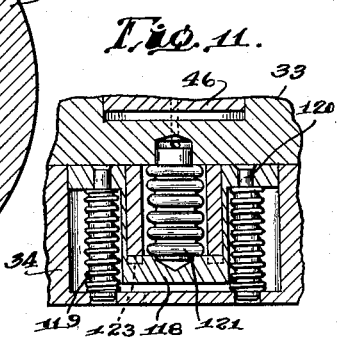
Fig. 11 is a similar view showing the parts in a different relative position.

The locking means for the latch bar 105 includes a locking bar or member 118 (see Figs. 4, 10 and 11) mounted in the section 34 of the plunger beneath the arms 107. The member 118 is adapted for a limited up and down movement to the plunger and when there is no hydraulic pressure within the system is held in its upward position by a pair of coil springs 119 which are mounted on rods 120 and held under compression between the member 118 and the plunger section 34. A bellows 121 interposed between the plunger section 33 and the locking member 118 is operable by hydraulic pressure to lower the member 118. The bellows communicates with the pressure chamber 43 through a conduit 122 (Fig. 4).

The arms 107 of the latch bar 105 are formed with notches 123 (see Figs. 8, 11, 13) in their lower surface which are brought into register with the locking bar 118 when said latch bar is moved to the left as above described. If there is hydraulic pressure within the system at the time the bar 105 is actuated by the cam 117ᵃ, the locking bar 118 is held in its lowered position, permitting the return of the bar 105. If a broken bottle has dissipated the pressure the bellows 121 is ineffective so that when the bar 105 is moved to the left (Fig. 16), the locking bar 118 is lifted by its springs 119 into the notches 123 and locks the bar 105, preventing its return movement.

The operation of the machine may be summarized as follows: The cam 82 is rotated continuously and operates through the rack 72 and gear 76 to move the plunger 24 up and down periodically. When the plunger is in its lowered position the jaws 60 are closed around the bottle being tested. While the plunger is being drawn upward, the latch bar 105 engages and lifts the bars 65ᵃ when the plunger reaches an intermediate position and thereby opens the jaws, releasing the bottle which has been tested. While the jaws are open and in their lifted position, the next bottle, filled with liquid, is placed on the bottom plate 90 (Fig. 1). The cam 94 then operates to lift the bottle into position to be gripped by the jaws 60 when the plunger is moved downward and the jaws close. When the bottle is thus gripped, the bottom plate 90 is lowered by its cam, leaving the bottle suspended from said jaws. Continued downward movement of the plunger after the jaws have closed around the bottle projects the bulb 47 and its surrounding shield 54 downwardly within the bottle neck, thereby displacing a certain amount of liquid. This insures the bottle being entirely full when the sealing gasket 51 seats on the bottle as the plunger completes its downward movement.

The air control valve 96 (Fig. 1) is now opened by the cam 98 to admit air pressure to the chamber 40 in the plunger. This pressure is transmitted through the diaphragm 38 to the hydraulic system including the bulb 47 and through the latter to the liquid in the bottle. If the bottle is sound and withstands the pressure, there is little or no inflation of the bulb 47. If the bottle breaks and dissipates the pressure therein, the diaphragm 38 is moved downward, forcing the liquid out of the chamber 39. The bulb 47 expands sufficiently to accommodate the liquid forced therein by such movement of the diaphragm.

Referring to Figs. 18 and 19, the lowering of the plunger takes place while the section 82ᵃ of the cam 82 traverses the roll 87. While the next section 82ᵇ of the cam is traversing said roll, the plunger remains down and the pressure is maintained. The cam lobe 117ᵃ also operates at this time to rock the arm 112 and move the latch bar 105 inward. The latch bar is immediately returned if there is pressure in the system but is latched by the locking bar 118 if the bottle under test has been broken. The section 82ᶜ of the cam moves the plunger upward to an intermediate position in which the latch bar 105 is brought into engagement with the crossbars 65ᵃ. If the bottle under test has been broken so that the locking bar 118 is operative to hold the latch bar 105, the jaws 60 will be opened and release the broken bottle when the cam section 82ᵈ reaches the roll 87. If the bottle is unbroken, the jaws remain closed while the cam section 82ᵈ is traversing the roll 87. The cam section 82ᵉ next operates to lower the plunger a short distance. This brings the latch bar 105 opposite the upper contact screw 115 (Fig. 4) and the cam lobe 117ᵇ now operates to move the latch bar inward. If the pressure has been maintained in the bottle, the latch bar is immediately returned. If the pressure has been dissipated, the latch bar is held in by the locking bar 118. The cam section 82ᶠ operates to lift the plunger the remainder of its upstroke so that the jaws are opened during the final upward movement and the bottle released. If the bottle under test has given way after the section 82ᵇ of the cam has passed the cam roll so that the latch bar has been locked as just described, then the jaws will be opened before the plunger has reached the limit of its upward movement.

In order to segregate the defective or broken bottles from the sound ones, a chute 125 (Fig. 16) may be brought into position to catch the portion of the article which is broken off. A second chute 126 may be positioned to catch the remainder of the broken bottle which is released by the opening of the jaws. These chutes are brought into position by a movement either of the testing heads or the chutes.

Modifications may be resorted to within the spirit and scope of the appended claims.

We claim:

1. Testing apparatus for applying internal pressure within an open-mouthed hollow article, which comprises an impervious elastic bulb, means for introducing said bulb into the article, means for sealing the mouth of the article while the latter is filled with a liquid, and means for applying a predetermined pressure within the bulb and thereby transmitting the pressure through the liquid to the walls of the article.

2. Testing apparatus for applying internal pressure within an open-mouthed hollow article, which comprises an impervious elastic bulb, means for introducing said bulb into the article, means for sealing the mouth of the article while the latter is filled with a liquid, and means for applying hydraulic pressure within said bulb.

3. Apparatus for testing bottles comprising a sealing gasket, means for sealing the gasket on the open mouth of a container filled with a liquid, said gasket having an opening therethrough, a diaphragm of impervious material, a closed hydraulic system comprising means providing a space filled with a liquid, said diaphragm forming a dividing wall between the liquid in said space and the liquid within the container, and means to apply a predetermined pressure to the liquid in said system.

4. Apparatus for testing bottles comprising a sealing gasket, means for sealing the gasket on the open mouth of a container filled with a liquid, said gasket having an opening therethrough, a diaphragm of impervious material, a closed hydraulic system comprising a chamber filled with liquid, said diaphragm forming a wall portion of said system and separating it from the liquid in the container, a second diaphragm forming a wall of said chamber, and means for applying pneumatic pressure to said second diaphragm and thereby transmitting the pressure to said hydraulic system.

5. Apparatus for testing hollow articles, comprising means for gripping the article, a plunger, an impervious diaphragm carried by the plunger, means for reciprocating the plunger and causing the diaphragm to enter the open mouth of said article, means cooperating with the diaphragm to seal the mouth of the article while the latter is filled with a liquid, and means for applying hydraulic pressure through the plunger to the diaphragm and thereby transmitting pressure through the diaphragm to the liquid within the container.

6. Apparatus for testing bottles and similar articles, comprising gripping jaws for gripping the neck of an article, a plunger, a bulb of impervious, elastic material carried by the plunger, means for actuating the plunger and projecting said bulb into the neck of the article, a gasket carried by the plunger and brought into position to seal the mouth of the article when the plunger is actuated, and means for applying hydraulic pressure within said bulb when the mouth of the article is sealed.

7. Apparatus for testing bottles, comprising gripping jaws for gripping the neck of a bottle, a plunger, a bulb of impervious, elastic material carried by the plunger, means for actuating the plunger and projecting said bulb into the neck of the bottle, a hydraulic system providing a sealed space, a liquid filling said space, said space including a passageway leading through the plunger to said bulb, and means for applying pressure to said sealed liquid and causing a pressure to be transmitted through the bulb to the interior of the bottle.

8. Bottle testing apparatus comprising a pair of gripping jaws, means for actuating said jaws for gripping a bottle to be tested and for releasing the bottle, means for applying an internal pressure to the bottle while held by said jaws, and mechanism controlled by pressure developed within the bottle to effect an opening of the jaws at a predetermined time if the pressure has been dissipated by breaking of the bottle and preventing the opening of the jaws at said time if the pressure in the bottle has been maintained.

9. Bottle testing apparatus comprising means for gripping a bottle, means for applying internal hydraulic pressure to the bottle while held by the gripping means, apparatus for actuating the gripping means and pressure applying means by a predetermined cycle of operations, and means controlled by pressure developed within the bottle for causing the release of the gripping means at a predetermined time during said cycle when the bottle is sound and the pressure therein normally maintained and for releasing the gripping means at a different time during said cycle when the pressure has been dissipated through imperfection or breakage of the bottle.

10. Apparatus for testing bottles comprising a pair of gripping jaws for gripping a bottle to be tested, a plunger, means for reciprocating the plunger toward and from the gripping jaws and a bottle gripped thereby, means carried by the plunger for sealing the bottle, means for applying pressure through the plunger to the interior of the bottle, a bar carried by the plunger, and means in the path of said bar and operated positively thereby for opening the gripping jaws when the plunger is moved away from the bottle.

11. Apparatus for testing bottles comprising a pair of gripping jaws for gripping a bottle to be tested, a plunger, means for reciprocating the plunger toward and from the bottle, means carried by the plunger for sealing the bottle, means for applying pressure through the plunger to the interior of the bottle, means actuated by the plunger for opening the gripping jaws when the plunger is moved away from the bottle, and selective means controlling the time at which the bottle is released during the movement of the plunger, said selective means including apparatus controlled by the pressure within the bottle and operable to effect a release of the bottle at a predetermined point during the movement of the plunger if pressure is maintained within the bottle and at a different point if the pressure has been dissipated.

12. Bottle testing apparatus comprising a pair of gripping jaws for gripping a bottle, a plunger movable toward and from the bottle, means for actuating the plunger, means carried by the plunger for sealing the bottle, means for applying pressure through the plunger to the interior of the sealed bottle, means actuated by the plunger when it is withdrawn to a predetermined point to open the gripping jaws and release the bottle if the pressure therein has been dissipated, and means controlled by pressure within the bottle for automatically preventing release of the gripping jaws when the plunger reaches said point if the pressure has been maintained within the bottle.

13. Bottle testing apparatus comprising a pair of gripping jaws for gripping a bottle, a plunger movable toward and from the bottle, means for actuating the plunger, means carried by the plunger for sealing the bottle, means for applying pressure through the plunger to the interior of the sealed bottle, a latch bar carried by the plunger, a lock for the latch bar, said latch bar providing an operating connection between the plunger and the gripping jaws and operable to open the jaws when the plunger is withdrawn to a predetermined position, and means operated by pressure within the container to lock the latch bar in an inoperative position.

14. Bottle testing apparatus comprising bottle gripping means, a plunger, a cam, means for continuously rotating the cam, operating connections between the cam and plunger for reciprocating the latter toward and from a bottle held by said gripping means, means carried by the plunger for sealing the bottle, means for applying hydraulic pressure through the plunger to the interior of the sealed bottle, and automatic means controlled by the pressure within the bottle for effecting a release of the gripping jaws from the bottle at a predetermined point during the movement of the plunger away from the bottle when the pressure has been dissipated through breakage of the bottle, and for effecting an opening of the jaws at a different point during the withdrawal of the plunger when the pressure has been maintained within the bottle.

15. Apparatus for testing bottles comprising a bulb of flexible, impervious material, a shield surrounding the bulb, means for projecting said shield and bulb into the neck of a bottle, a sealing gasket surrounding said shield and sealing the mouth of the bottle, and means for applying hydraulic pressure within said bulb.

16. Bottle testing apparatus comprising a pair of gripping jaws, a plunger, means for reciprocating the plunger, means for actuating the jaws, a latch bar carried by the plunger and providing an operating connection between the plunger and the means for actuating said jaws, means for applying hydraulic pressure to the interior of a bottle held by said jaws, a locking bar operable to lock the latch bar in a predetermined position, and a bellows operated by hydraulic pressure for holding the locking bar in an inoperative position.

17. Bottle testing apparatus comprising a plunger, supporting means on which the plunger is mounted for reciprocating movements, a bulb of elastic impervious material carried by the plunger, a tubular shield surrounding the bulb and carried by the plunger, means for gripping a bottle and holding it in a predetermined position relative to said supporting means, and means for actuating the plunger and projecting said shield and bulb into the neck of the bottle.

ALBERT S. JACKSON.
CLARENCE A. HEYNE.